W. A. KENYON, Jr., & F. S. WAGENHALS.
Hose Coupling.
No. 123,914. Patented Feb. 20, 1872.
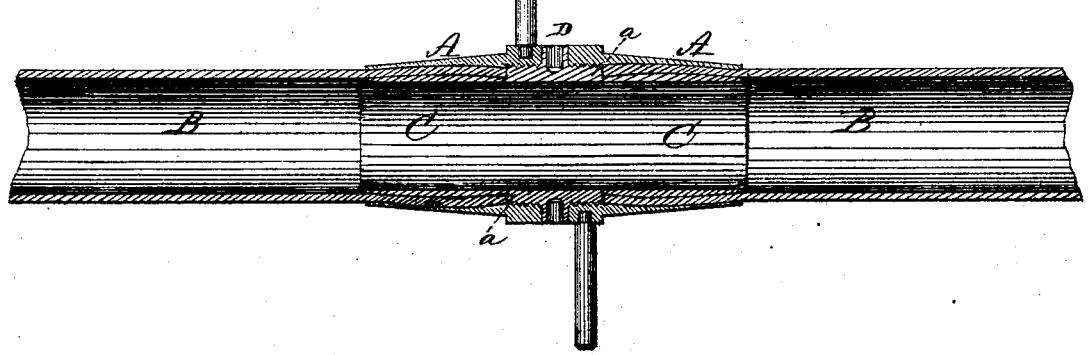
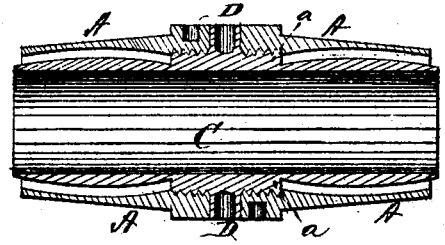

UNITED STATES PATENT OFFICE.

WILLIAM A. KENYON, JR., AND FRANK S. WAGENHALS, OF LANCASTER, OHIO.

IMPROVEMENT IN HOSE-COUPLINGS.

Specification forming part of Letters Patent No. 123,914, dated February 20, 1872.

SPECIFICATION.

*To all whom it may concern:*

Be it known that we, WILLIAM A. KENYON, Jr., and FRANK S. WAGENHALS, of Lancaster, in the county of Fairfield and State of Ohio, have invented certain new and useful Improvements in Coupling Hose; and we do hereby declare that the following is a full, clear, and exact description thereof, reference being had to the accompanying drawing and to the letters of reference marked thereon, which form a part of this specification.

The nature of our invention consists in the construction and arrangement of a hose-coupling, as will be hereinafter more fully set forth.

In order to enable others skilled in the art to which our invention appertains to make and use the same, we will now proceed to describe its construction and operation, referring to the annexed drawing, in which—

Figure 1 represents a longitudinal vertical section of our coupling fastening two pieces of hose together, and Fig. 2 is a similar view of the coupling alone.

A represents a metal collar, having a female screw-thread cut at one end. The balance of the collar is on the inside cut out in a barrel shape up to the commencement of the nut part. Into this collar the hose B is inserted to make the attachment. Into the collar and into the opening of the hose is screwed a conical or barrel-shaped piece or tube, C, which, by its bulging, presses the hose into the collar where it is excavated, and thus renders it firm and impossible to escape. The conical tube C, which enters the hose, extends a very little beyond the collar, giving support to the hose within, thereby preventing the breakage at the usual point of most wear. The tube C may be double, or, in other words, consists of a tube with conical or barrel-shaped ends, and right and left hand screw-threads on the outside in the center, thus forming a double coupling when the ends are inserted in two collars. In the center of the tube C, when it is a double coupling, is formed a collar, D, in the shape of a nut, with holes for the insertion of a pin or handle for turning the same. In a single coupling this nut is formed on the outer or screw end of the barrel-shaped tube. Similar nuts are also formed on the outer ends of the collars A A, as shown in the drawing. It will also be noticed that upon the tube C, where the barrel shape ceases and the screw commences, is a shoulder, *a*, which, when the tube is screwed into place, comes up against the end of the hose, spreading the same, and causing the hose to remain more firmly.

With a coupling of this construction, when the hose breaks at any point the hose can be cut off, and the coupling, either double or single, as the case demands, may be applied at once without delay. The support within the hose prevents the wear and tear at the joint in a great degree.

The coupling can be applied in the middle of any hose; and it is especially adapted for atmospheric brakes and fire-engine hose.

I am aware that a hose has been held by a nearly analogous arrangement, but dependent upon the pressure of its extremity into the interior pipe or barrel, and the constant weakening of said barrel, the said hose being thus grasped externally by a female screw-thread; but this I do not claim; but What I do claim is—

In combination with the barrel-shaped tube C, having nut D and shoulder *a*, the collar A having its interior excavated or shaped like a barrel, and extending nearly to the end of the tube C, its extremity being smaller than the C, with the hose thereon, over which it must bellied portion of the barrel be forced, all substantially as and for the purpose set forth.

In testimony that we claim the foregoing as our own we affix our signatures in presence of two witnesses.

WILLIAM A. KENYON, JR.
FRANK S. WAGENHALS.

Witnesses:
D. N. KINSMAN,
VIRGIL E. SHAW.